(12) United States Patent
Wurman et al.

(10) Patent No.: US 9,067,317 B1
(45) Date of Patent: Jun. 30, 2015

(54) EFFICIENT SHUFFLING OF MOBILE DRIVE UNITS FOR INVENTORY HOLDERS

(71) Applicant: Amazon Technologies, Inc., Seattle, WA (US)

(72) Inventors: Peter R. Wurman, Acton, MA (US); Matthew David Verminski, North Andover, MA (US); Michael Cordell Mountz, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/576,561

(22) Filed: Dec. 19, 2014

Related U.S. Application Data

(63) Continuation of application No. 14/021,949, filed on Sep. 9, 2013.

(51) Int. Cl.
| | |
|---|---|
| G06F 7/00 | (2006.01) |
| B25J 9/16 | (2006.01) |
| B65G 1/137 | (2006.01) |
| G05B 15/02 | (2006.01) |
| G06Q 10/08 | (2012.01) |

(52) U.S. Cl.
CPC ............ *B25J 9/1602* (2013.01); *B65G 1/1373* (2013.01); *G05B 15/02* (2013.01); *Y10S 901/01* (2013.01); *G06Q 10/08* (2013.01); *G06Q 10/087* (2013.01)

(58) Field of Classification Search
CPC ...... B25J 9/1602; G06Q 10/087; G06Q 10/08
USPC ........................................................ 700/216
See application file for complete search history.

(56) References Cited

U.S. PATENT DOCUMENTS

| | | |
|---|---|---|
| 2007/0017984 A1 | 1/2007 | Mountz et al. |
| 2007/0021863 A1 | 1/2007 | Mountz et al. |
| 2007/0021864 A1 * | 1/2007 | Mountz et al. ................ 700/216 |
| 2008/0001372 A1 | 1/2008 | Hoffman et al. |
| 2009/0185884 A1 * | 7/2009 | Wurman et al. ............. 414/270 |
| 2013/0173049 A1 * | 7/2013 | Brunner et al. .............. 700/216 |

OTHER PUBLICATIONS

Office Action for U.S. Appl. No. 14/021,949, mailed on Jun. 9, 2014, Peter R. Wurman, "Efficient Shuffling of Mobile Drive Units for Inventory Holders", 12 pages.

* cited by examiner

*Primary Examiner* — Gene Crawford
*Assistant Examiner* — Kyle Logan
(74) *Attorney, Agent, or Firm* — Lee & Hayes, PLLC

(57) ABSTRACT

A mobile drive unit that freely and independently moves about a facility to transport inventory holders. The mobile drive unit may operate through communications with other drive units, or under a more centralized control of a management module. For various operating scenarios, the mobile drive unit is directed to shuffle the inventory holders in a manner that minimizes travel of the mobile drive unit, thereby improving overall system efficiency. One or more mobile drive units may be used to transport inventory holders to and from a region, and to sequentially reposition or slide each of the inventory holders within the region according to a priority ordering.

20 Claims, 16 Drawing Sheets

EFFICIENT SHUFFLING OF MOBILE DRIVE UNITS FOR INVENTORY HOLDERS

CROSS REFERENCE TO RELATED APPLICATIONS

This is a continuation application which claims priority to commonly assigned, U.S. patent application Ser. No. 14/021,949, filed Sep. 9, 2013. Application Ser. No. 14/021,949 is fully incorporated herein by reference.

BACKGROUND

Modern inventory systems, such as those in mail-order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. For instance, in product distribution centers (e.g., fulfillment centers), vast quantities of products are processed for shipment to consumers traditionally using manual labor and/or mechanical handling equipment (e.g., conveyor systems, forklifts, etc.).

Inventory systems that are tasked with responding to large numbers of diverse inventory requests typically exhibit inefficient utilization of system resources, including space, equipment, and manpower. This can, in turn, result in lower throughput, unacceptably long response times, an ever-increasing backlog of unfinished tasks, and generally poor system performance. Additionally, expanding or reducing the size or capabilities of many inventory systems requires significant changes to existing infrastructure and equipment. As a result, the cost of incremental changes to capacity or functionality may be prohibitively expensive, thereby limiting the ability of the system to accommodate fluctuations in system throughput.

Accordingly, there remains a need for improved techniques for handling products in a distribution center that reduce the potential for damaged products and increases efficiency in delivering products to a consumer, while minimizing operating costs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
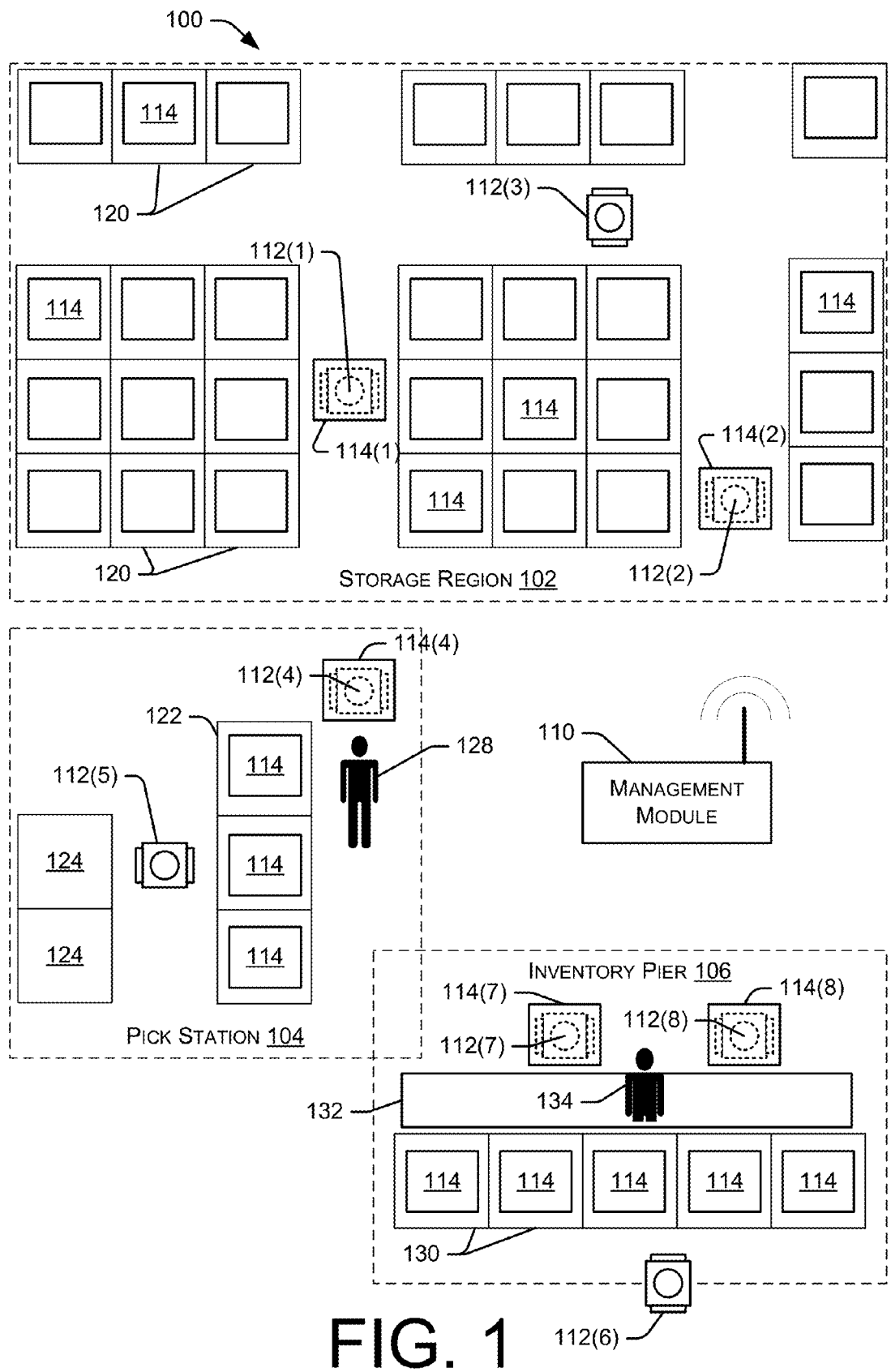
FIG. 1 illustrates an inventory system having multiple regions and mobile drive units that carry inventory holders about the regions.

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems of the present disclosure utilize one or more mobile drive units to automatically retrieve inventory holders from warehouse storage. The inventory holders may be entire racks of shelves, with each shelf having bins for various inventory items. Mobile drive units may be self-powered robotic devices configured to move freely about the warehouse. Racks may be transported by mobile drive units to a pick station for performing inventory operations. The station may include a human operator and/or automated equipment to remove desired inventory items from the inventory holders and complete orders. In some operations, the items are removed from inventory holders and placed on order holders, which too can be maneuvered by the mobile drive units. Throughout this document, reference is made to inventory holders as the racks that are moved about by the mobile drive units. It is noted that inventory holders is used in the general sense as structures that hold inventory items, items that are part of an order, packaging elements for the orders, and essentially any other item or element that might be used by the inventory and fulfillment system. As such, inventory holders may also be referred to as holders, order holders, container holders, bins, and so forth.

The ability for mobile drive units to transport inventory items to a station for performing inventory operations rather than or in addition to workers manually retrieving inventory items from stationary racks may vastly increase efficiency and productivity of the inventory system. For example, by utilizing mobile drive units, an inventory system may be capable of fulfilling more orders per hour than previous solutions. Mobile drive units may move about the warehouse and/or retrieve inventory holders in response to commands and/or instructions received from an automated guidance system. For example, a management module may control administration and coordination of certain elements and/or tasks within the warehouse. The management module may receive orders for inventory items in the warehouse and coordinate task assignments for fulfilling the orders, including providing instructions to mobile drive units to transport racks with requested inventory items to an inventory station for completion of an order. The management module may also provide guidance at the inventory station for how the order is to be assembled.

To use a simple illustration, in a distribution warehouse for an office supply store, the management module may receive an order for a printer, several ink cartridges, and a box of paper. The management module may determine the locations of these items within the racks of storage in the distribution warehouse. The items may, for instance, be on the shelves of three separate racks. The management module may issue tasks for three different mobile drive units to retrieve each rack respectively holding the printer, ink cartridges, and paper, and for the mobile drive units to transport the racks holding those items to an inventory station where the three items may be picked from the racks and packed into a box for shipment. In doing so, the management module may coordinate the various tasks such that all of the orders received by the management module are fulfilled in an efficient manner.

Orchestrating movement of the mobile drive units is non-trivial. This is particularly true at the pick station where human and/or mechanical pickers retrieve items from the inventory holders. The mobile drive units are continuously moving the inventory holders into and out from the pick stations to place the appropriate items near the pickers at the right time. For existing pick stations, current inventory systems face a challenge of increasing the lines per hour (lph) so that pickers may retrieve more items per hour, thereby improving efficiency and throughput of the inventory system.

The inventory systems described herein utilize efficient shuffling techniques in which the mobile drive units reposition the inventory holders in ways that present appropriate items at the pick station at the correct time, while minimizing the amount of movement each mobile drive unit makes to reposition the inventory holders. The efficient shuffling techniques may be used at various locations or stations of the inventory system, including at pick stations, deep storage locations, and high volume inventory piers. One example shuffling technique involves defining multiple locations at a pick station for arranging inventory holders in priority order. Such locations may include a primary set of pick locations in which the inventory holders are positioned next to the picker and a secondary set of staging locations adjacent to, but spaced from, the pick locations. One or more mobile drive units may then be used to efficiently deliver inventory holders from storage to the staging locations, remove the recently-picked inventory holders from the pick locations to the staging locations prior to returning them to storage, and sequentially move up each of the inventory holders in the pick locations in priority order. In some cases, a single mobile drive unity may perform the shuffling techniques. In other cases, one or more mobile units are used to deliver inventory units to the pick station and remove the inventory units after items have been picked, and one mobile unit is used to reshuffle the inventory holders among the pick locations at the pick station.

For instance, suppose a pick station has three pick locations to hold three inventory holders. Each pick location has an area footprint to accommodate an inventory holder at rest within the pick location. The first pick location is closest to the picker and a first inventory holder holding the current items to be picked by the picker is placed in the first pick location. The second pick location is next to the first pick location to hold a second or on-deck inventory holder holding the next items to be picked by the picker after the items on the first inventory holder have been picked. The third pick location is next to the second pick location to hold a third inventory holder. Furthermore, suppose there are one or more temporary or staging locations near the pick locations.

According to one shuffle implementation, when the picker has finished with the first order or inventory holder, a mobile drive unit repositions the first inventory holder from the first location to a staging location. Thereafter, the same mobile drive unit repositions the second inventory holder from the second pick location to the first pick location vacated by the first inventory holder. Subsequently, the same mobile drive unit repositions the third inventory holder from the third pick location to the second pick location vacated by the second inventory holder. This sequential sliding of the inventory holders keeps items readily available to the picker, while minimizing the amount of wasteful travel time by the mobile drive units. Further, the same mobile drive unit or other drive units may be used to deliver new inventory holders to the pick station, initially depositing them at staging locations, and removing the recently-picked inventory holders (such as the first inventory holder noted above) from the staging locations back to storage or other regions of the warehouse.

This and other examples of operating an inventory system are described below. The techniques discussed herein may be implemented in many different ways, by many different systems. Various representative implementations are provided below with reference to the figures.

FIG. 1 shows one illustrative example of an inventory system 100 that may be used to implement a technique for efficient shuffling of inventory holders. The inventory system 100 may be arranged in a facility or warehouse (e.g., distribution facility, fulfillment center, etc.) that is logically organized into areas or regions associated with various functions. In the illustrated example, the warehouse includes a storage region 102, a pick station 104, and an inventory pier 106. In practice, depending upon the size of the inventory system 100, the warehouse may hold more than one of the storage regions 102, pick stations 104, and inventory piers 106, or the warehouse may be configured without the storage region 102, or the pick station 104, or the inventory pier 106.

The inventory system 100 includes a management module 110, multiple mobile drive units 112, and inventory holders 114. Only some of the inventory holders 114 are shown referenced with the number 114 for ease of illustration. The mobile drive units 112 are independent, self-powered robotic devices that may move freely about the warehouse, under their own direction or through coordination by the management module 110. In alternative implementations, the mobile drive units 112 may be configured to move inventory holders 114 along tracks, rails, cables, or other guidance elements traversing the associated workspace. In such implementations, mobile drive units 112 may receive power through a connection to the guidance elements, such as a powered rail. In some embodiments, the inventory system 100 may include two or more different types of mobile drive units 112 having various capabilities and specifications. Moreover, although illustrated and discussed as though mobile drive units 112 are a particular type of mobile drive unit, mobile drive units 112 may refer to various types of mobile drive units. For example, one type of mobile drive unit 112 may be operable to transport relatively large, heavy, or bulky inventory items. Another type of mobile drive unit 112 may be operable to transport relatively lighter and/or more compact inventory items. Mobile drive units 112 may accordingly have various power trains, load capacities, and other appropriate specifications to transport particular inventory items in various types of the inventory holders 114 within the inventory system 100.

The mobile drive units 112 may be used at various times to transport the inventory holders 114 around the warehouse among the regions. For instance, the mobile drive units 112 may transport the inventory holders 114 between the storage region 102 and the pick station 104 or inventory pier 106.

Each inventory holder 114 may be implemented as a physical structure to hold various inventory items. The inventory holder 114 has a physical length, width, and height that may be standardized or varied within the inventory system. As used herein, the inventory holders 114 may be configured to hold essentially any type or size of item or be used for any number of purposes, including, but not limited to, carrying pallets, storing shipping supplies, holding garbage, supporting empty boxes waiting for inventory, supporting filled boxes with items once orders are fulfilled, and so on. Furthermore, as used herein, inventory holders also include holders for other types of products or items and hence include order holders.

In one implementation, the inventory holder 114 may be formed as a rack having multiple shelves to support various types of inventory items. For instance, the inventory holders 114 may include multiple storage bins with each storage bin capable of holding a different type of inventory item. The inventory holders 114 are capable of being carried, rolled, or otherwise moved by the mobile drive units 112. Each inventory holder 114 may have a plurality of faces, and each bin may be accessible through specific faces. The rack is freestanding when at rest, but can be lifted and moved by the mobile drive units 112. The mobile drive units 112 may be configured to rotate inventory holders 114 at appropriate times to present particular faces of inventory holders 114 and the associated bins to an operator or other components of inventory system 10. One example is described below in more detail with reference to FIG. 2.

The mobile drive units 112 transport the inventory holders 114 between any number of predefined physical locations on the warehouse floor. For illustration purposes, rectangular areas are depicted in FIG. 1 to designate physical locations within the facility that may be used to place an associated inventory holder. Each location may accommodate an inventory holder 114. That is, each inventory holder 114 may stand at rest within the area of the floor reserved or otherwise predefined as a storage location 114. The storage region 102, for example, has multiple storage locations 120 arranged in sets of nine storage locations with aisles between the sets. An inventory holder 114 may be placed within a corresponding storage location 120 until needed by a picker at the pick station 104 or inventory pier 106. In other layouts, there may be more or less than nine storage locations per zone in the storage region 102.

One or more mobile drive units 112 are provided in the storage region 102 to shuffle inventory holders 114 among the storage locations 120 and to transport the inventory holders between the storage region and other regions in the warehouse. Two loaded drive units 112(1) and 112(2) are shown in the storage area 102 carrying associated inventory holders 114(1) and 114(2), respectively, down aisles between the sets of predefined storage locations 120. An unloaded drive unit 112(3) is also shown moving through an aisle between the predefined storage locations 120.

The pick station region 104 is designed with multiple locations 122 and 124 to accommodate associated resting inventory holder 114. In FIG. 1, the pick station 104 has five locations arranged in two linear rows. A first line of three pick locations 122 is mapped next to a picking area in which a picker 126 picks inventory from the inventory holders 114 at the pick locations 122 and loads them into boxes or containers supported by another inventory holder 114(4) mounted on a mobile drive unit 112(4). In this illustration, the picker 126 is a human, although the picker may alternatively or additionally involve a mechanical picking apparatus. A second line of two staging locations 124 is mapped adjacent to, but spaced from, the first line of pick locations 122. The staging locations 124 temporarily hold inventory holders 114 on the way to and from the pick locations 122 of the pick station 104. It is noted that five locations are merely representative, and that pick stations 104 may be designed with more or fewer than five locations.

A mobile drive unit 112(5) is shown at the pick station 104. The mobile drive unit 112(5) may be essentially dedicated to the pick station to shuffle inventory holders 114 among the pick and staging locations 122 and 124 of the pick station 104 according to the techniques described herein. Alternatively, the mobile drive unit 112(5) may be directed to the pick station 104 on an as-needed basis. In some implementations, multiple drive units 112 may be used to service the pick station 104, with one or more mobile drive units used to carry inventory holders 114 to and from the staging locations 124 and one or more mobile drive units to shuffle the inventory holders 114 among the pick and staging locations 122 and 124 of the pick station 104.

The inventory pier 106 facilitates higher volume inventory. In many inventory systems, a small percentage of high velocity and/or high volume inventory are responsible for a large percentage of overall system activity. High velocity inventory may refer to popular inventory that is requested by a large percentage of orders, while high volume inventory may refer to inventory that is requested in large volumes by orders. Volume may refer to the physical amount of cubic space certain inventory items require in the warehouse. High volume inventory items may refer to large or bulky items and/or items that are purchased in large quantities by individual orders. In some inventory systems, for example, the top 1% of inventory items may account for over 20% of overall system activity. Highly popular items may require a correspondingly high use of mobile drive units to transport inventory holders to inventory stations. Similarly, high volume inventory may require relatively more labor to replenish inventory holders storing such items such that breaking down such items into inventory holders may be less efficient than merely using the inventory for orders in the manner it arrives from a wholesaler. A more efficient method of filling orders for such items may be realized using an inventory pier. The inventory pier may store highly popular and/or high volume inventory. Inventory holders that store popular or high volume inventory may be positioned along one side of the inventory pier. The inventory pier may accordingly be configured to include a configurable number of fixed positions for top inventory items. For an example inventory system storing 3,000 unique inventory items, as few as thirty unique inventory items may account for a high percentage of system activity due to high velocity or high volume of such items. Thus, in such an inventory system, the inventory pier may include a sufficient amount of defined areas to store the 30 top inventory items at the inventory pier.

Order holders may, for example, be racks of shelving that are configured to hold boxes or containers that will be used to fill orders for inventory items. Each box or container may be associated with a particular order. For instance, an order holder may store a cardboard box that is to be used for shipping an order for several ink cartridges and several reams of paper. Order holders with orders needing such items may visit positions along the inventory pier corresponding to inventory holders storing inventory items needed by the orders. Operators may remove items from the inventory holders and place them into appropriate boxes or containers in the order holder. If necessary, the order holder may then be taken to an inventory station to fill items remaining on the orders in the boxes or containers of the order holder.

To illustrate, in the office supply example discussed above, paper may be a high volume inventory item and ink cartridges may be a highly popular item. Accordingly, a pallet of paper and an inventory holder storing various ink cartridges may be stationed at the inventory pier. An order for several packages of paper and an ink cartridge may be filled by moving an order holder a location along the inventory pier opposite to the pallet storing the paper where an operator may transfer the paper to the order holder. The order holder may then move to a location opposite the inventory holder storing the ink cartridges where the same or a different operator may transfer the ink cartridge to the order holder. If the requested printer is not already stored at the inventory pier, a mobile drive unit may transport the order holder to an inventory station, where another mobile drive unit may transport an inventory holder containing the printer so that the order can be filled.

In FIG. 1, the inventory pier 106 is shown with multiple designated pier locations 130 to accommodate the inventory holders 114. Five pier locations 130 are illustrated to accommodate five corresponding holders 114, although there may be more or fewer pier locations per inventory pier 106. One mobile drive unit 112(6) is shown at the inventory pier 106 to shuffle inventory holders 114 among the pier locations 130 according to the techniques described herein. Two loaded mobile drive units 112(7) and 112(8) are shown at rest next to a pier 132 and holding associated inventory holders 114(7) and 114(8) (or more specifically in this case, order holders) for access by a picker 134 (again, represented as a human although a mechanical device may be used). In this example, the inventory holders 114(7) and 114(7) may be holding packages or containers for order fulfillment, where the picker 134 removes selected items from the inventory holders 114 positioned in pier locations 130 and loads the items into order containers on the inventory holders 114(7) and 114(8).

In some implementations, multiple mobile drive units may be used to bring inventory holders to and from the pier locations 130 of the inventory pier 106. Incoming inventory holders may be placed in temporary locations while a single mobile drive unit, such as unit 112(6), removes an existing inventory holder that has been recently picked by the picker 134 from a pier location 130 and replaces it with a new inventory holder with new items of interest for the picker 134.

In one implementation, the management module 110 orchestrates movement of the mobile drive units 112, directing them to various regions within the warehouse. The management module 110 coordinates transport of the various inventory holders among the regions in the warehouse. Furthermore, the management module 110 may be used to instruct the mobile drive units to perform the shuffle processes within a particular region (e.g., storage region 102, pick station 104, inventory pier 106, etc.). Generally, the shuffle process involves directing a mobile drive unit 112 to reposition a first inventory holder from its current location within the region to a temporary location within the region that is adjacent or proximal to the current location. The mobile drive unit 112 leaves the first inventory holder in the temporary location and subsequently positions a second inventory holder into the location vacated by the first inventory holder. The mobile drive unit 112 then lifts the first inventory unit to transport the first inventory holder away.

The management module 110 may use any form of communication to direct the mobile drive units. In one implementation, the management module 110 and the mobile drive units are configured to communicate using wireless technologies, such as a wireless local area network (WLAN). As one example, some embodiments of mobile drive unit 112 may communicate with management module 110 and/or with one another using Wi-Fi (IEEE 802.11), Bluetooth (IEEE 802.15), Infrared Data Association standards, or any other appropriate wireless communication protocol. As another example, in a tracked inventory system 100, tracks or other guidance element upon which mobile drive units 112 move may be wired to facilitate communication between mobile drive units 112 and the management module 110 and/or other components of inventory system 100.

In addition to directing the mobile drive units, the management module 110 may receive and/or generate requests to initiate any of a number of particular operations involving the mobile drive units 112, inventory holders 114, or other elements of inventory system 100. The management module 110 may select components of inventory system 100 to perform various operations and communicate commands, instructions, and/or other appropriate information to the selected components to facilitate completion of these operations. The management module 110 may receive orders for various inventory items and coordinate and administer various appropriate tasks to fill the orders. For example, an order may specify particular inventory items that have been purchased by a customer and that are to be retrieved from inventory system 10 for shipment to the customer. The management module 110 may receive the orders from any appropriate system and generates task assignments based, in part, on the orders including requests for inventory items. Based on the orders, the management module 110 may identify particular operations to be completed involving inventory items stored or to be stored within inventory system 100.

After generating one or more task assignments, the management module 110 selects appropriate components to complete particular tasks and transmits task assignments to selected components, such as the mobile drive units, to trigger completion of the relevant tasks. The relevant components then execute their assigned tasks. Each task assignment defines one or more tasks to be completed by a particular component. These tasks may relate to the retrieval, storage, replenishment, and counting of inventory items and/or the management of mobile drive units 112, inventory holders 114, or other components of inventory system 100. Depending on the component and the task to be completed, a particular task assignment may identify locations, components, and/or actions associated with the corresponding task and/or any other appropriate information to be used by the relevant component in completing the assigned task.

While the appropriate components of inventory system 100 complete assigned tasks, the management module 110 may interact with the relevant components to ensure the efficient use of space, equipment, manpower, and other resources available to inventory system 100. For example, the management module 110 may receive information from the various components of system 100 regarding their current location, state, and/or other characteristics. Based on its knowledge of the location, current state, and/or other characteristics of the various components of inventory system 100 and an awareness of tasks currently being completed, management module 100 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 100 may be able to support a number of techniques for efficiently executing various aspects of the operation of inventory system 100.

As a result, the management module 110 may enhance the efficiency of inventory system 100 and/or provide other operational benefits. For example, the management module 110 may determine particular inventory holders 114 to be stationed at the pick station 104 or inventory pier 106 based on determining that when placed at these locations, overall system activity may be reduced and/or picker efficiency is improved. Similarly, the management module 110 may group orders and assign tasks to fulfill orders such that order fulfillment activities are optimized.

Figure 2:
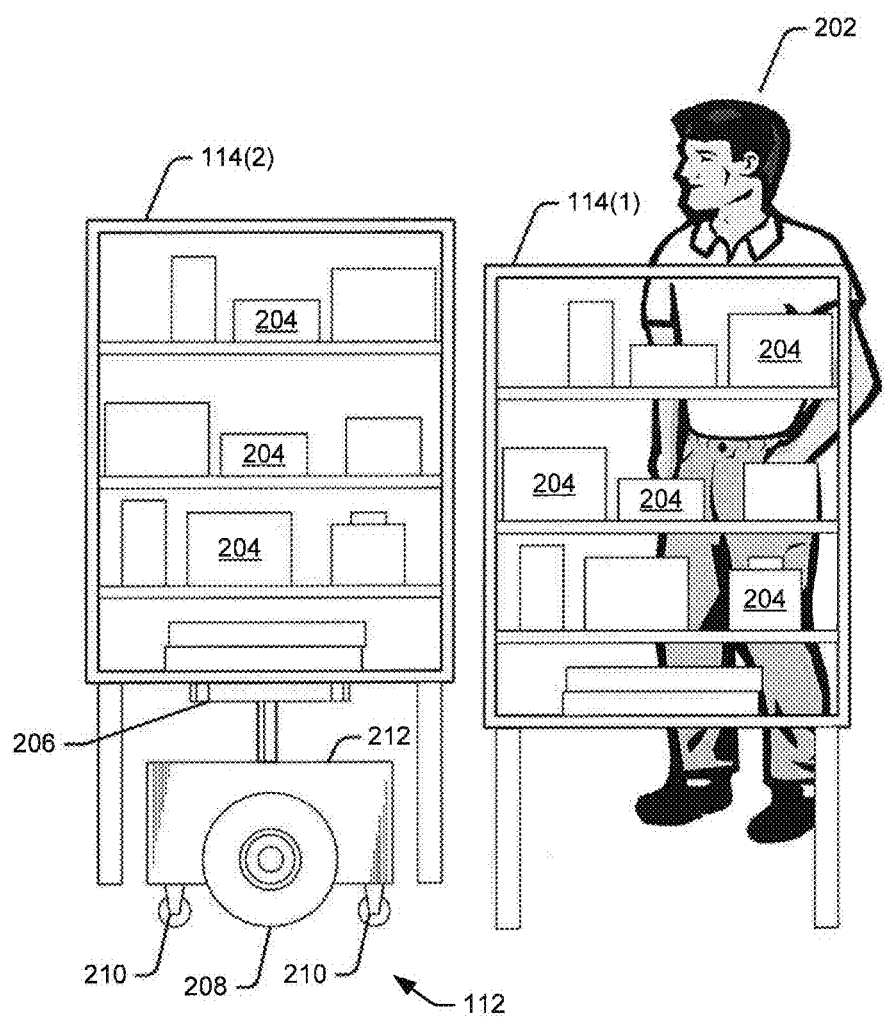
FIG. 2 shows a side view of a mobile drive unit and an inventory holder employed in the inventory system.

FIG. 2 illustrates a side-view illustration of a mobile drive unit 112 and inventory holders 114 employed in the inventory system 100. In this illustration, one inventory holder 114(1) is at rest in a first location next to a human picker 202. The inventory holder 114(1) has multiple shelves that support a variety of items 204. The inventory holder 114(1) has open side faces to facilitate stocking of the items 204 onto the shelves and picking of items from the shelves.

The inventory items 204 represent any objects suitable for storage, retrieval, and/or processing in an automated inventory system 100. For example, a given inventory item may represent a single stock-keeping unit (SKU) of a unique inventory item. Thus, inventory items may refer to a particular item and/or may refer to a quantity of items having a particular SKU as appropriate. As one example, the inventory system 100 may represent a retail distribution warehouse that stores bulk inventory items 204 for retail facilities, such as grocery stores and/or merchandise warehouses. As another example, the inventory system 100 may represent an e-commerce warehouse facility, and inventory items 204 may represent merchandise stored in the warehouse facility.

A mobile drive unit 112 is also shown moving a second inventory holder 114(2) into a second location next to the first location. The mobile drive unit 112 is positioning a second inventory holder 114(2) into a location for easy access by the picker 202 (such as at the inventory pier 102) or to place it in an on-deck location to be shuffled to the first location after the picker has completed picking items 204 from the first inventory holder 114(1) (such as at the pick station 104).

The mobile drive units 112 may transport the inventory holders 114 by docking with and/or coupling to a particular holder and moving the holder while docked. For example, as illustrated, the mobile drive unit 112 transports inventory holder 114 by moving beneath the inventory holder 112 and lifting a docking head 206 that interfaces with a bottom surface (or other portion) of inventory holder 114. The docking head 206 may be controlled by an actuator of mobile drive unit 112 operable to lift inventory holder 114 when docked. The docking head 206 may couple the mobile drive unit 112 to the inventory holder 114 or otherwise support the inventory holder 114 during transportation. The docking head 206 may also include any appropriate features to facilitate coupling to the inventory holder 114. For example, in some embodiments, a high-friction element may form all or a portion of the docking head 206, which abuts a portion of the inventory holder 114 while docked. In such embodiments, frictional forces created between the high-friction element of the docking head 206 and a surface of the inventory holder 114 may induce translational and rotational movement when docked.

The mobile drive unit 112 may utilize the docking head 206 to maneuver the inventory holder 114, such as by lifting, rotating, and/or moving the inventory holder 114 in any appropriate manner. In some implementations, the mobile drive unit 112 may be capable of rotating its docking head to rotate the inventory holder 114 while moving and/or while stopped. In addition or in the alternative, the mobile drive unit 112 may be capable of rotating the docking head independently or as a part of the movement of the mobile drive unit 112 as a whole. For example, the mobile drive unit 112 may rotate the inventory holder 114 as the mobile drive unit 112 executes a turn such that the inventory holder 114 continues to face the original direction of movement.

The mobile drive unit 112 is further equipped with multiple drive wheels 208 and multiple stabilizer wheels 210. A motor internal of a body 212 is used to power the drive wheels 208, while the stabilizer wheels 210 provide stability to the drive unit 112 to maintain balance of the coupled inventory holder 114. Using the drive wheels 208, the mobile drive unit 112 may transport the inventory holder 114 while the docking head is lifting inventory holder 112 or otherwise move the mobile drive unit 112 when the inventory holder 114 is undocked.

It should be noted that while a particular method of docking with the inventory holder 114 is illustrated, the mobile drive unit 112 may dock with the inventory holder 114 by connecting to, lifting, and/or otherwise interacting with the inventory holder 114 in any other suitable manner so that, when docked, the mobile drive unit 112 are coupled to and/or support inventory holder 30 and can move inventory holder 30. Further, in some embodiments, potentially some of the mobile drive units 112 may not dock with the inventory holders 114 with the inventory holder 114, but rather may remain continually mated with a particular inventory holder 114.

In some implementations, the mobile drive unit 112 may perform a shuffle process to efficiently place the next inventory holder 114 adjacent to the picker 202. The mobile drive unit 112 may shuffle the inventory holders according to a pattern programmed into the unit, and/or under the direction of the management module 110. At the most basic level, the mobile drive unit 112 moves a new inventory holder into the location currently occupied by an existing inventory holder.

With reference to FIG. 2, suppose the mobile drive unit 112 is tasked to shuffle the second inventory holder 114(2) into the first location currently occupied by the first inventory holder 114(1) adjacent to the picker 202. This situation may represent, for example, a pick station scenario where the picker 202 has completed picking items 204 from the first inventory holder 114(1) and is ready to pick items from the second inventory holder 114(2). The mobile drive unit 112 initially moves beneath the first inventory holder 114(1), mounts the docking head 206, and lifts the inventory holder off of the ground. The mobile drive unit 112 then moves the first inventory holder 114(1) out of its current location next to the picker 202 to a temporary adjacent location. After the mobile drive unit 112 sets down the first inventory holder 114(1) at the temporary location, the drive unit moves beneath the second inventory holder 114(2). The mobile drive unit 112 mounts the docking head 206 and lifts the inventory holder off of the ground. The mobile drive unit 112 repositions the second inventory holder 114(2) from its current location to the location next to the picker 202 that was just vacated by the first inventory holder 114(1). The mobile drive unit 112 sets down the second inventory holder 114(2) at the first location for the picker to begin picking items 204. Meanwhile, the same or different mobile drive unit 112 returns to the first inventory holder 114(1) at the temporary location, lifts it up, and moves it to another region, such as to the storage region 102.

Figure 3:
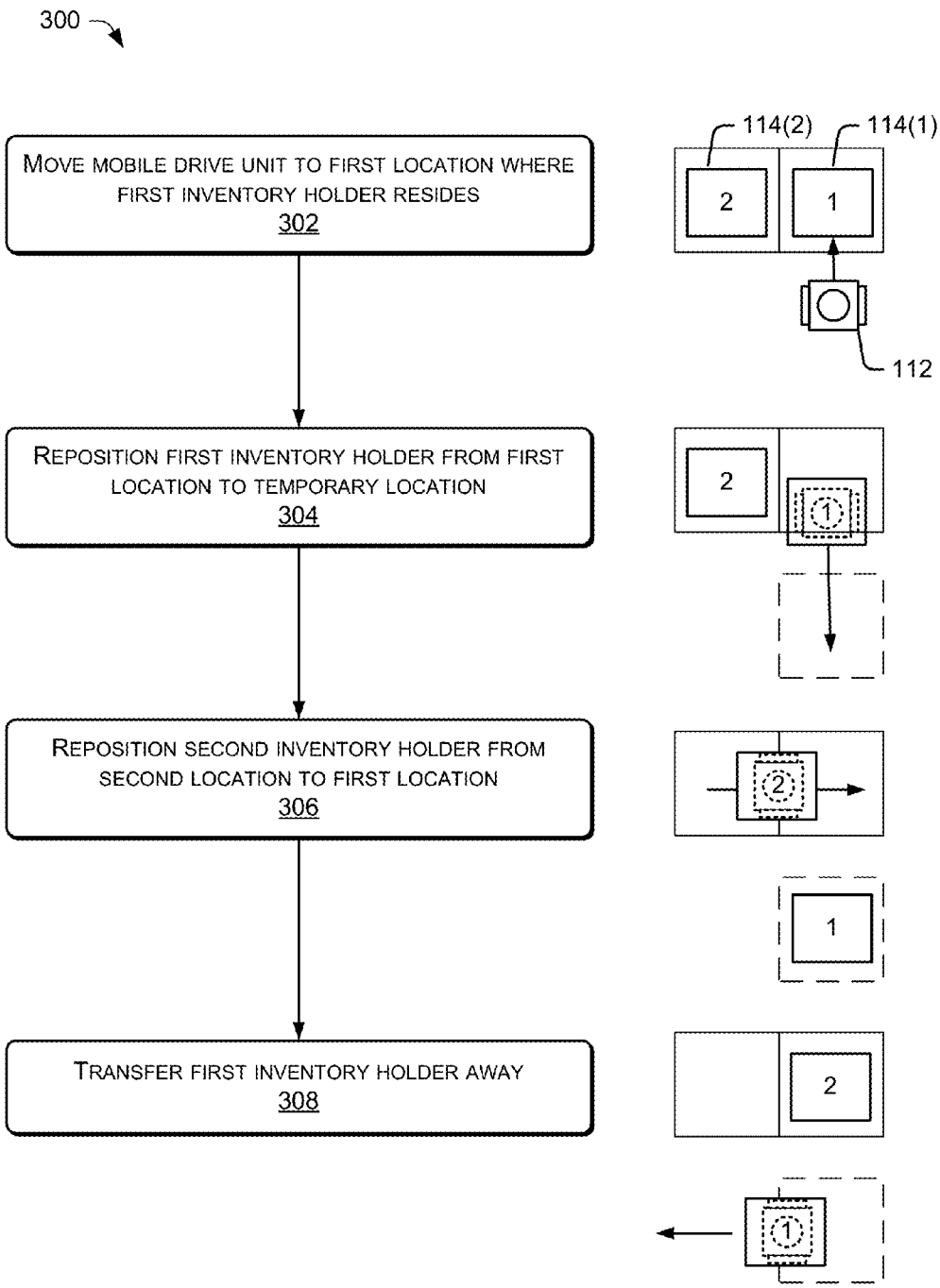
FIG. 3 is a flow diagram illustrating an example shuffle process that may be implemented by the inventory system.

FIG. 3 shows this basic shuffle process 300 that may be implemented by the inventory system 100. The process is illustrated as a collection of blocks in a logical flow graph. Some of the blocks represent actions taken by the mobile drive unit under the direction of computer-implemented operations performed at the drive unit or the management module. In the context of software-based operations, the blocks represent computer-executable instructions stored on one or more computer-readable storage media that, when executed by one or more processors, direct the mobile drive units to perform the recited acts. The order in which the operations are described is not intended to be construed as a limitation, and any number of the described blocks can be combined in any order or in parallel to implement the processes. It is understood that the following processes may be implemented with other architectures than the inventory system 100 described above.

Adjacent to the blocks, the process 300 includes a pictorial representation of a single mobile drive unit 112 performing the steps of the shuffle process with two inventory holders 114(1) and 114(2) according to the arrangement of FIG. 2.

At 302, a mobile drive unit 112 is moved to a first location at which a first inventory holder 114(1) is positioned. The mobile drive unit 112 is positioned under the inventory holder 114(1) and lifts it off of the ground.

At 304, the mobile drive unit 112 repositions the first inventory holder 114(1) from the first location to a temporary location proximal to the first location. As illustrated, the mobile drive unit 112 may essentially move the inventory holder out of the first location and set it down.

At 306, the mobile drive unit 112 repositions the second inventory holder 114(2) from its current or second location to the first location vacated by the repositioning of the first inventory holder 114(1). The mobile drive unit 112 is positioned under the second inventory holder 114(2), lifts it off of the ground, moves it to the first location, and sets it down again.

At 308, the mobile drive unit 112 (or another mobile drive unit) transports the first inventory holder 114(1) away from the temporary location.

The shuffle process 300 may be executed in any number of situations, such as shuffling inventory holders up the pick line at the pick station 104, shuffling inventory holders within a set of storage locations in the storage region 102, or shuffling the inventory holders at the inventory pier 106. The shuffle process involves minimum movement of the mobile drive unit 112 to improve efficiency of the inventory system 100. Each of these scenarios is described below in more detail with reference to FIGS. 4-6.

FIGS. 4A-4J show use of the shuffle process in a scenario 400 to shuffle inventory holders at a pick station 104. The pick station 104 has five predefined locations including a primary set of three pick locations 402 and a secondary set of two staging locations 404. Three inventory holders A, B, and C are positioned in the three pick locations 122(1), 122(2), and 122(3), respectively, and a fourth inventory holder D is positioned a staging location 124(2). It is noted that more or less locations and inventory holders may be arranged at a pick station 104.

One or more mobile drive units 112 may be used to shuffle the inventory holders among the multiple pick locations and the multiple staging locations at the pick station. For discussion purposes, this scenario is described as being performed by a single drive unit. However, in other implementations, one mobile drive unit may be used to move the inventory holders among the pick locations 122 and one or more other drive units are used to bring inventory holders to, and remove them from, the staging locations 124.

Figure 4A:
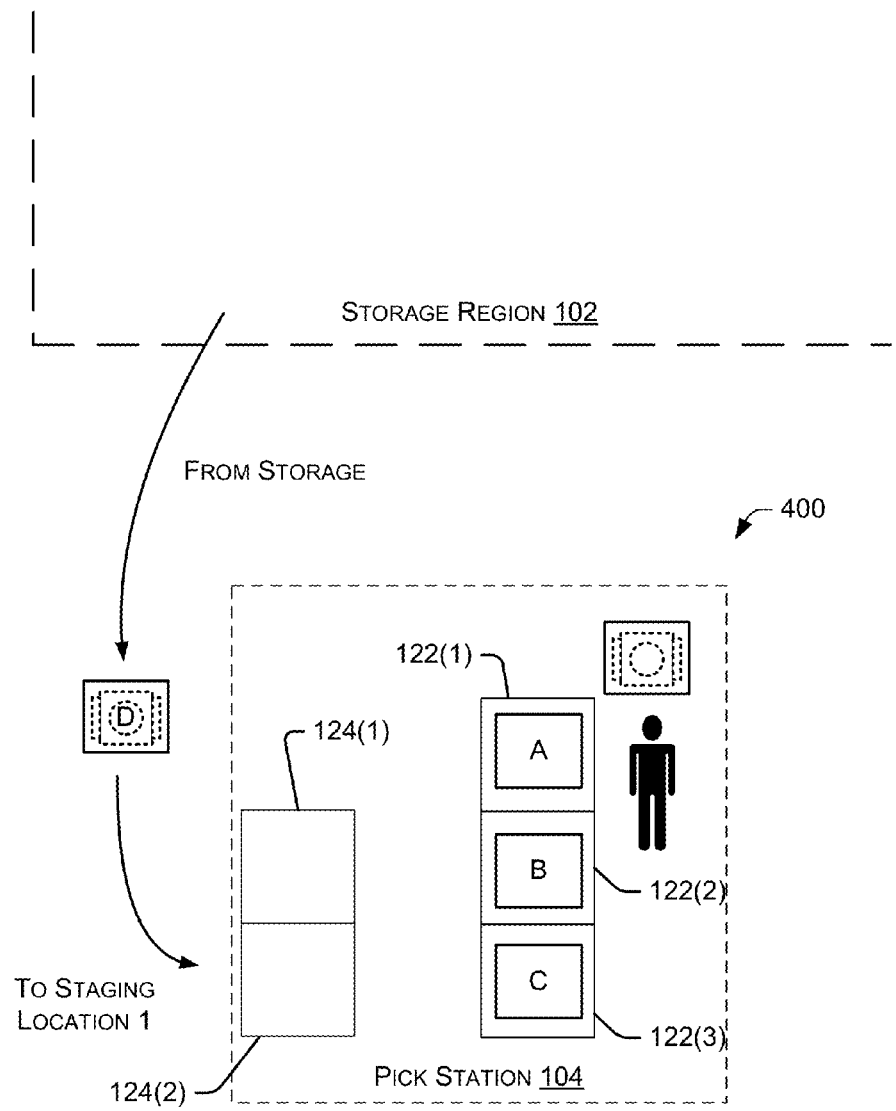
FIGS. 4A-4K present a sequence of illustrations to show use of the shuffle process of FIG. 3 to shuffle inventory holders at a pick station.
Figure 4B:
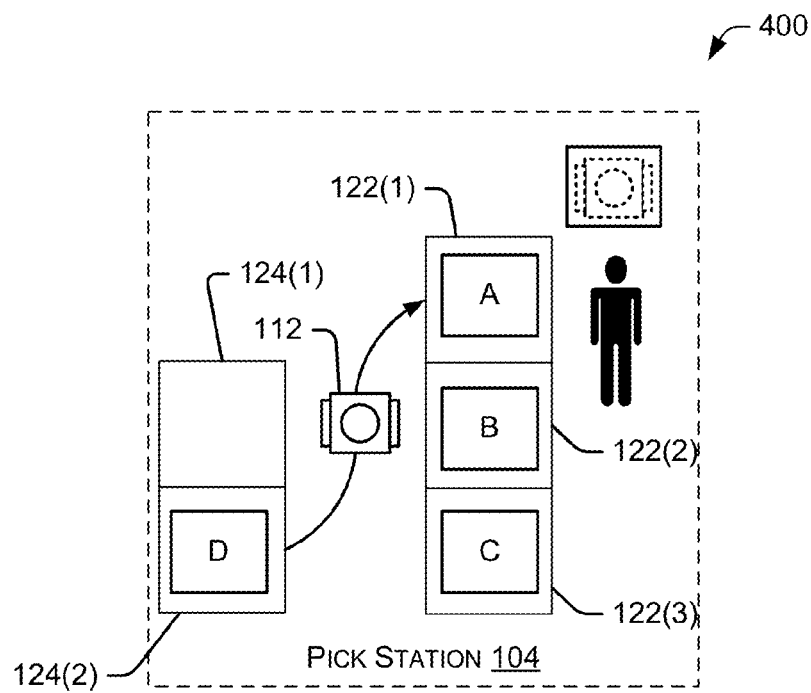
Figure 4C:
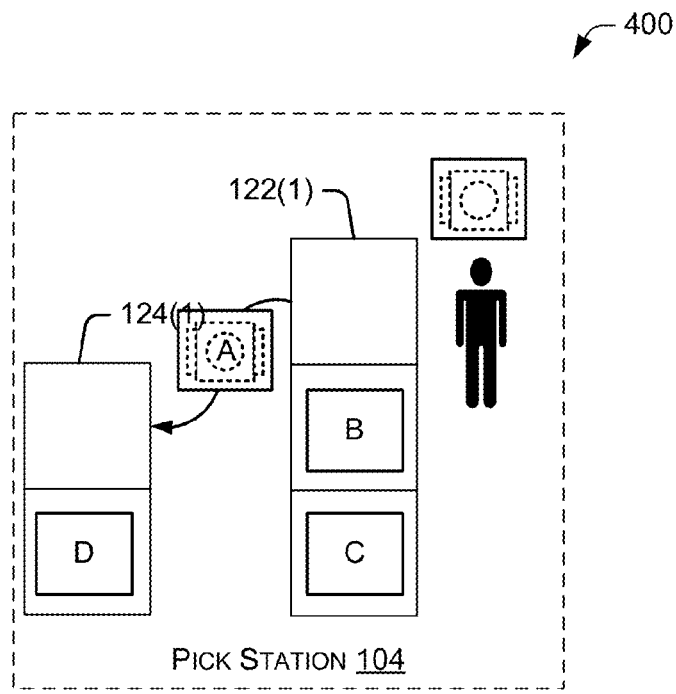

In FIG. 4A, a mobile drive unit 112 retrieves a new inventory holder D from a place separate from the pick station 104, such as the storage region 102. The mobile drive unit 112 deposits the new inventory holder D in the staging location 124(2). In FIG. 4B, the mobile drive unit 112 moves to a first pick location 122(1) adjacent to the picker. The mobile drive unit 112 moves under the inventory holder A and engages the inventory holder A. This inventory holder A has just recently been completed by the operator, and is ready to be removed for restocking if fully picked, or maneuvered to another location (e.g., storage, pick station, pier, shipping station, etc.) for subsequent usage. In FIG. 4C, the mobile drive unit 112 repositions the most recently-picked inventory holder A from the first pick location 122(1) to an empty staging location 124(1).

Figure 4D:
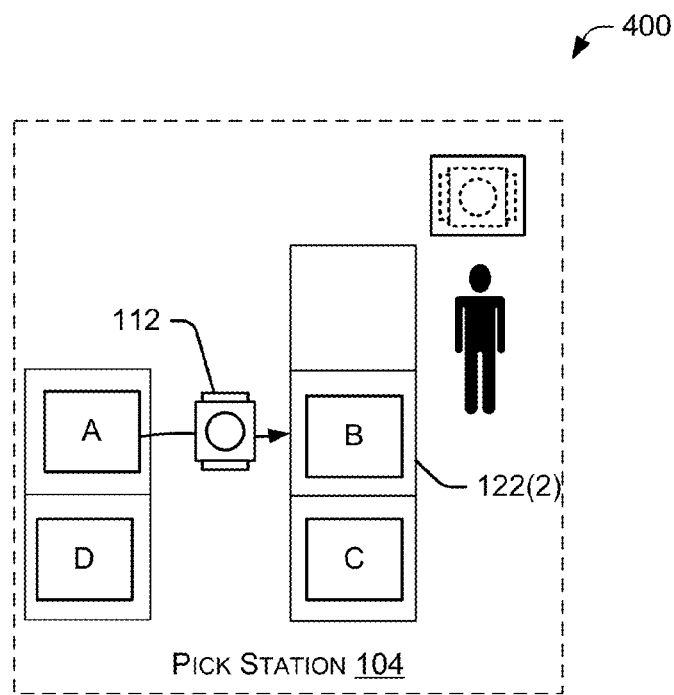
Figure 4E:
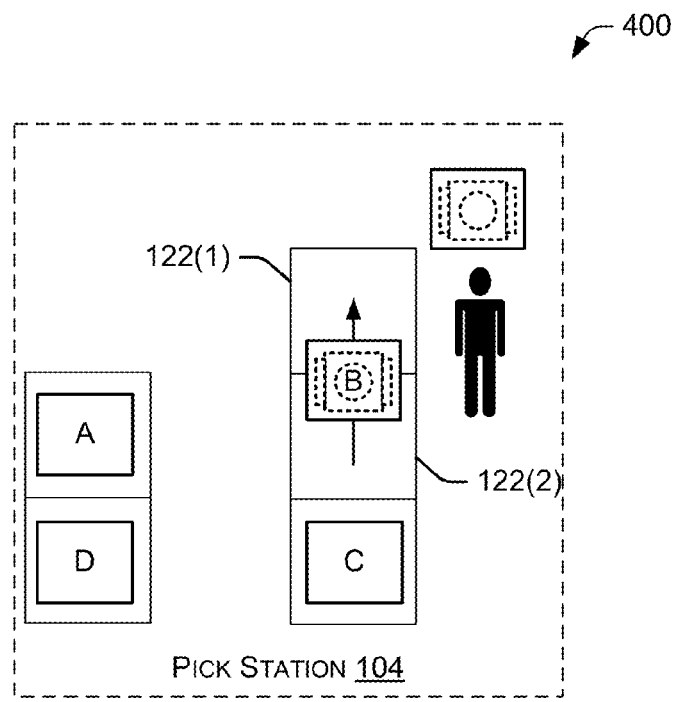

Thereafter, in FIG. 4D, the mobile drive unit 112 moves to the second pick location 122(2). In FIG. 4E, the mobile drive unit 112 repositions an on-deck inventory holder B from the second pick location 122(2) to the first pick location 122(2) vacated by the repositioning of the recently-picked inventory holder. Accordingly, the inventory holder B is now positioned for the picker to more quickly pick items.

Figure 4F:
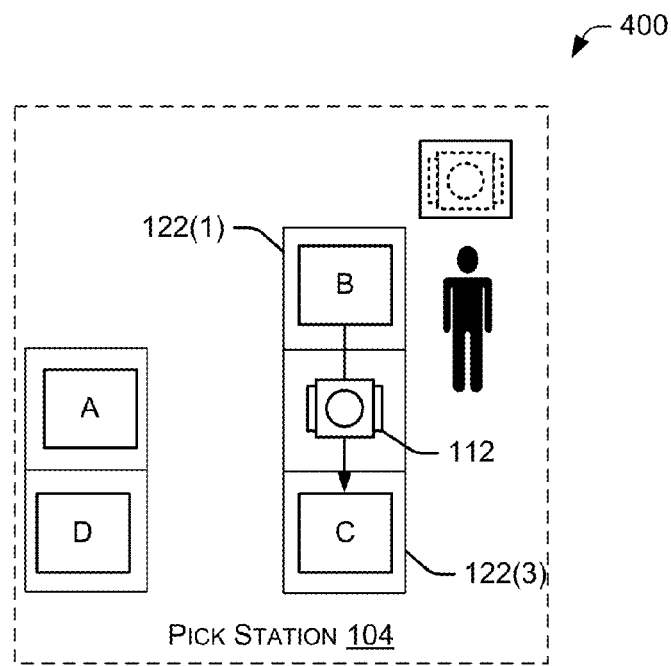
Figure 4G:
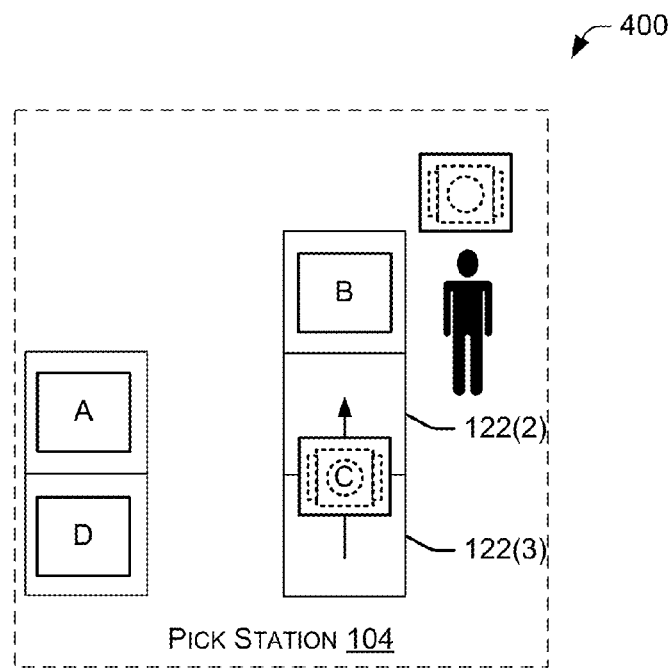

In FIG. 4F, the mobile drive unit 112 moves from the first pick location 122(1) to the third pick location 122(3). In FIG. 4G, the mobile drive unit 112 repositions the inventory holder C from the third pick location 122(3) to the second pick location 122(2) vacated by the repositioning of the inventory holder B. In this manner, the inventory holder C is moved to the on-deck location as next up for the picker.

Figure 4H:
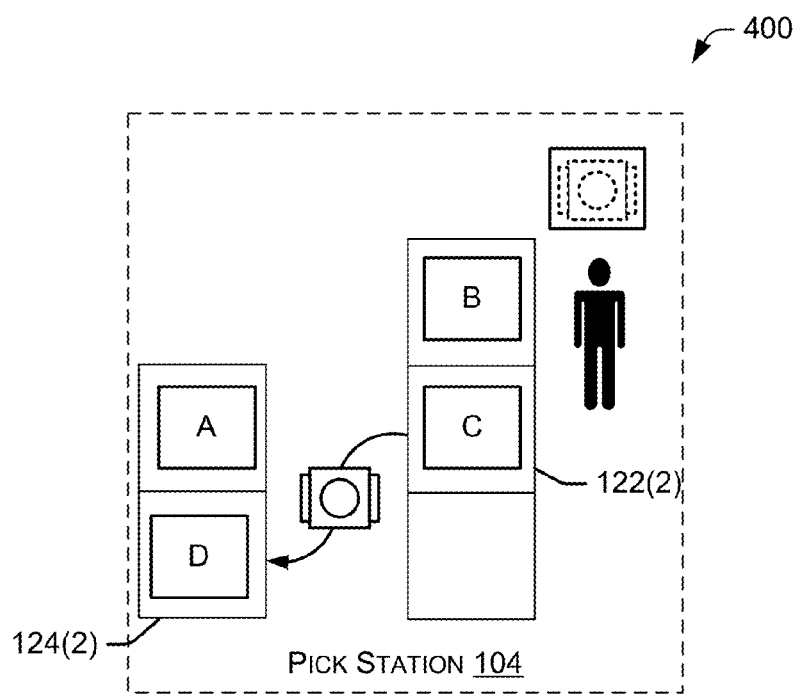
Figure 4I:
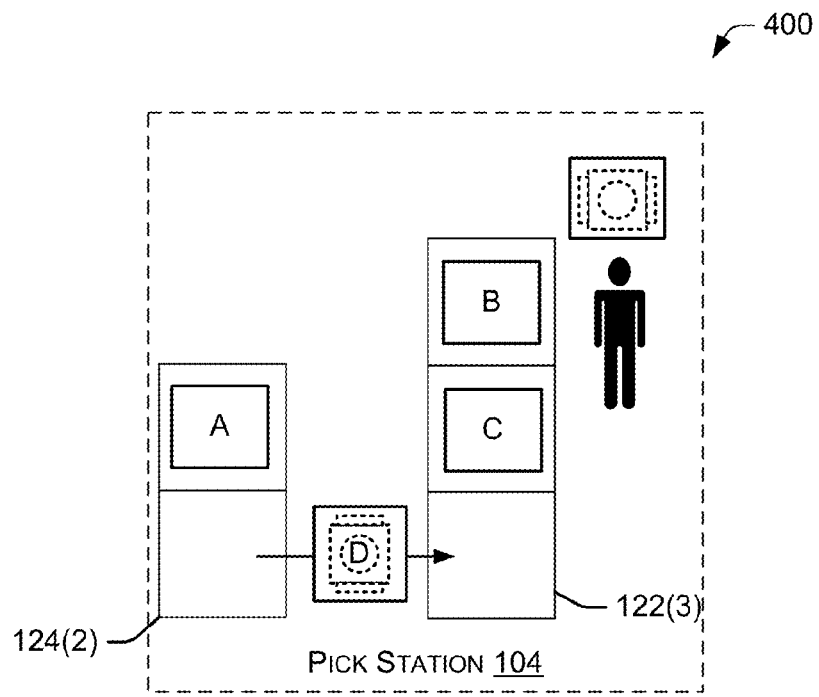

In FIG. 4H, the mobile drive unit 112 moves from the second pick location 122(2) to the second staging location 124(2) to grab the new inventory holder D. In FIG. 4I, the mobile drive unit 112 repositions the newest inventory holder D from the staging location 124(2) to the third pick location 122(3) vacated by the repositioning of the inventory holder C.

Figure 4J:
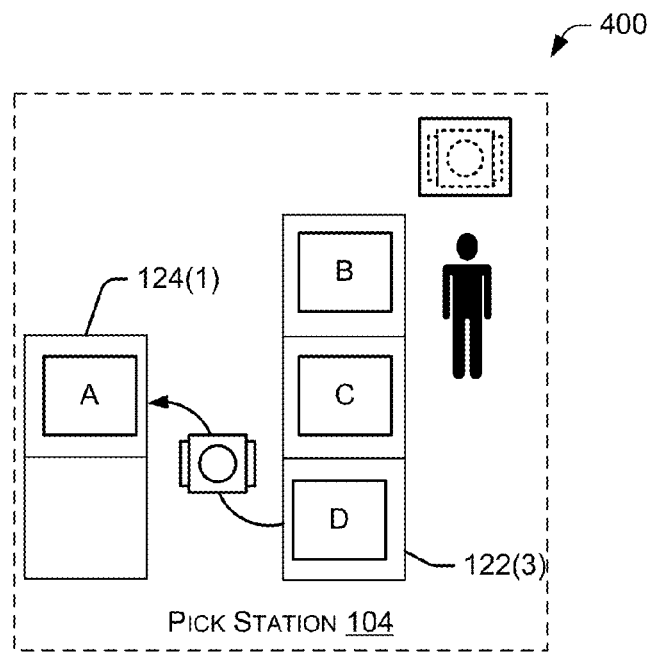
Figure 4K:
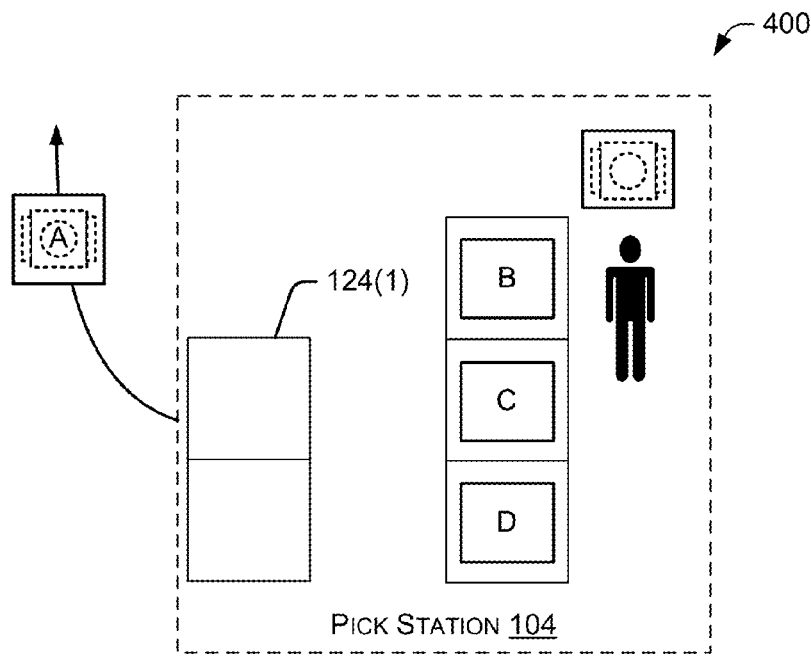

In FIG. 4J, the mobile drive unit 112 moves from the third pick location 122(3) to the staging location 124(1) to pick up the recently-picked inventory holder A. In FIG. 4K, the mobile drive unit transfers the recently-picked inventory holder A away from the staging location 124(1) to remove the inventory holder A from the pick station 104.

In this scenario, the shuffle process enables the drive unit to efficiently slide a set of inventory holders up in priority at a pick station. That is, the inventory holders at the pick locations 122 form a queue where the inventory holder closest to the picker at pick location 122(1) is highest priority. The picker is most likely to pick inventory from this holder or put inventory into this holder, although the picker may also pick inventory from other holders in the various pick locations. During shuffle, the next inventory holders B, C, and D are moved up in the priority queue established by the pick locations. Additionally, a new inventory holder is delivered to the pick station while the inventory holder most recently picked may be removed from the pick station.

It is noted that in some situations, the new inventory holder D may be placed higher in the queue than other holders. For instance, the management module 110 may determine that the inventory holder D now holds inventory items that the picker should work on next and hence reprioritize the existing queue. In this situation, the shuffle process repositions the new inventory holder D from the staging location 124(2) to a higher priority pick location, such as locations 122(1) or 122(2) rather than the last available slot of location 122(3), that is ahead of at least one other inventory holder already residing in the pick location queue.

FIGS. 5A-5F show use of the shuffle process in a scenario 500 to shuffle inventory holders at a storage region 102. The storage region includes multiple sets of storage locations 120, such as the set of nine locations. Nine holders are positioned in the storage locations, including an inventory holder A in position 120(1) and an inventory holder B in position 120(2). It is noted that more or less locations and inventory holders may be arranged within a predefined set of the storage region 102.

Figure 5A:
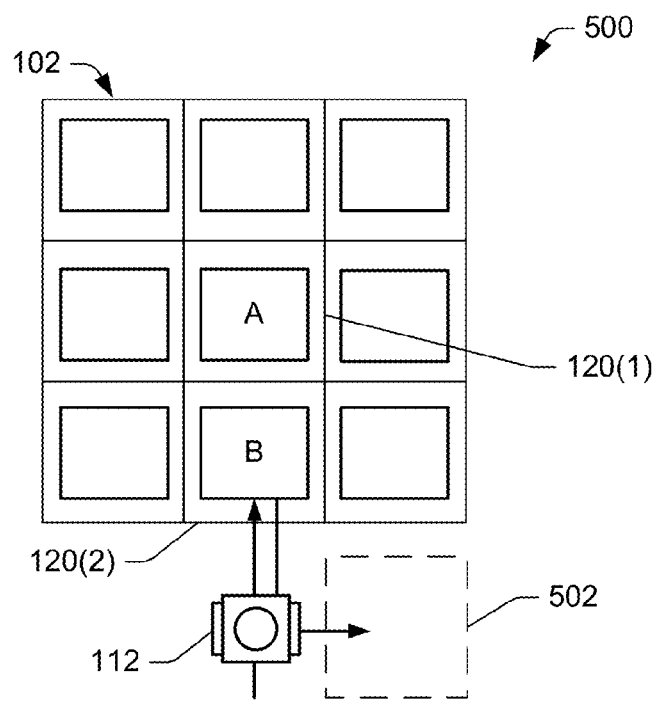
FIGS. 5A-5F present a sequence of illustrations to show use of the shuffle process of FIG. 3 to shuffle inventory holders at a storage region.
Figure 5B:
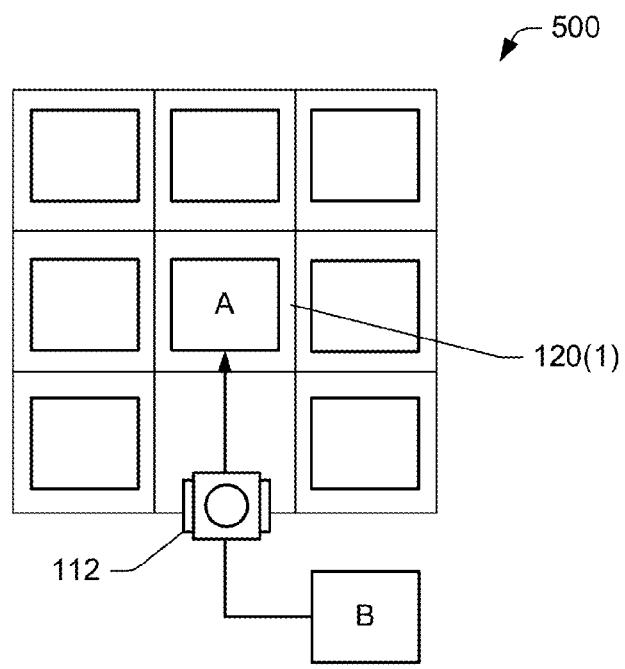

In FIG. 5A, the mobile drive unit 112 moves into the first storage location 122(2), lifts the inventory holder B, and temporarily moves it to a temporary location 502. As shown in FIG. 5B, the mobile drive unit then moves back through the storage location 120(2) to the internal storage location 120(1) beneath inventory holder A.

Figure 5C:
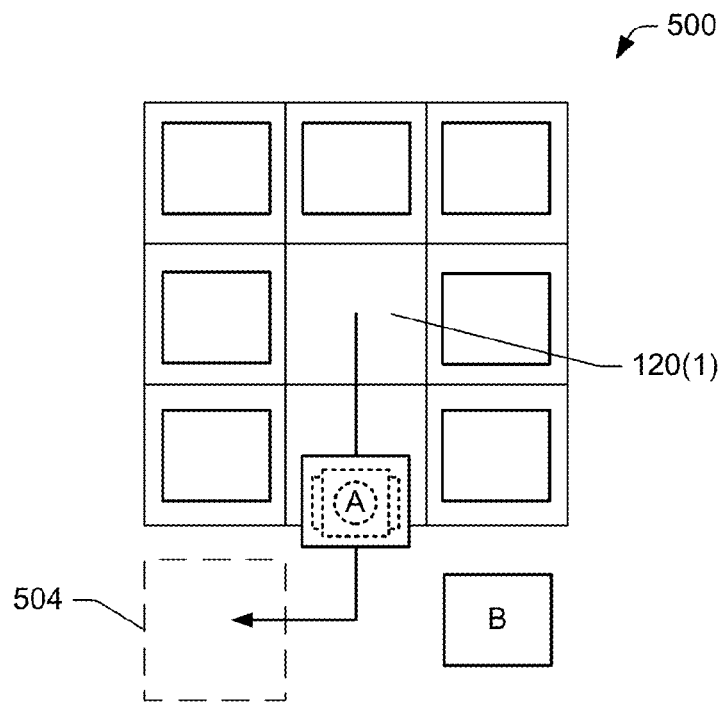

In FIG. 5C, the mobile drive unit 112 lifts the inventory holder A, and moves it to another temporary location 504.

Figure 5D:
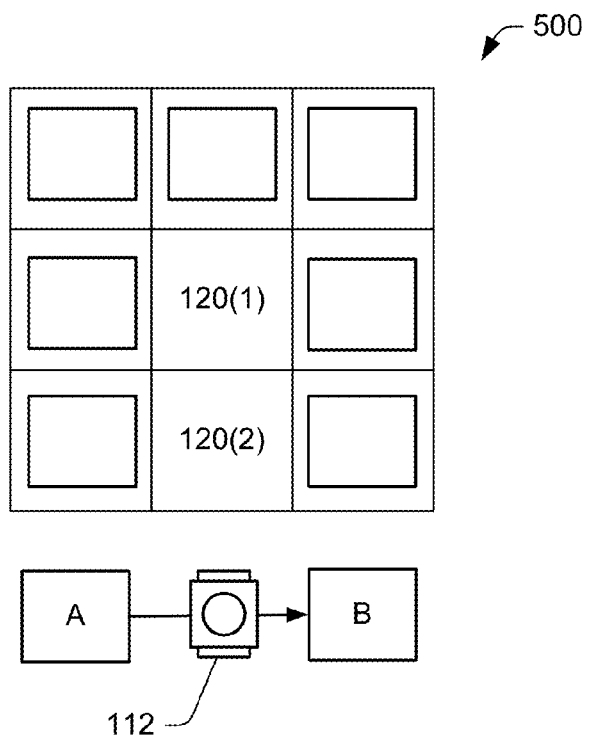

This leaves open two storage locations 120(1) and 120(2). In FIG. 5D, the mobile drive unit 112 moves from the temporary location for the inventory holder A back to the temporary location of the inventory holder B.

Figure 5E:
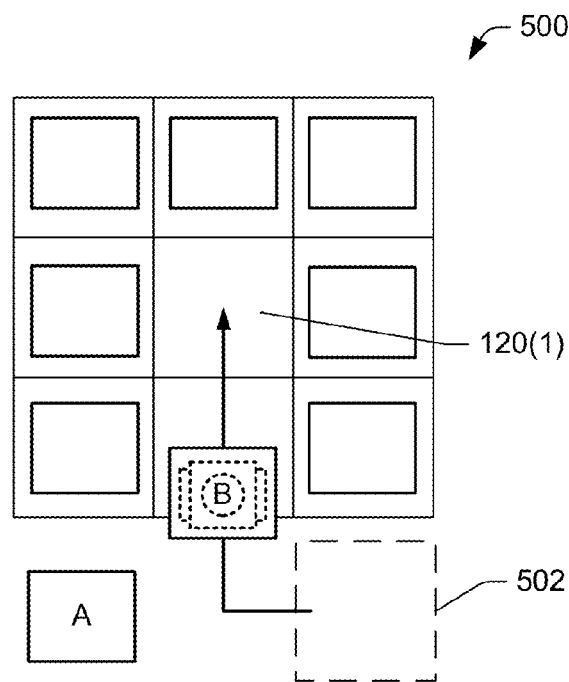
Figure 5F:
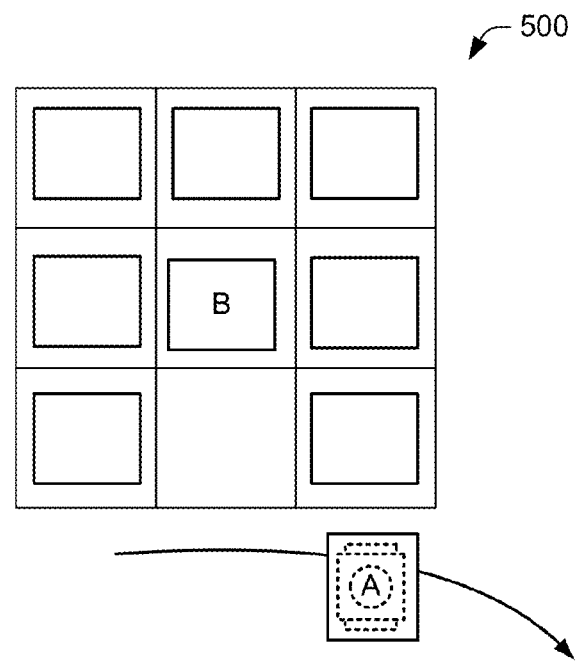

In FIG. 5E, the mobile drive unit 112 repositions the inventory holder B from the temporary location 502 to the storage location 120(1) just vacated by the first inventory holder A. The mobile drive unit 112 leaves the inventory holder B in the storage location 120(1) (or event storage location 120(2) and then returns to the temporary storage location 504 where the inventory holder A is temporarily resting. In FIG. 5F, the mobile drive unit removes the inventory holder A from the storage region 102.

Accordingly, in this scenario, the shuffle process enables the mobile drive unit to efficiently remove and replace inventory holders in a storage region. The travel distance of the mobile drive unit is minimized in this process, thereby improving efficiency of the system 100.

FIGS. 6A-6F show use of the shuffle process in a scenario 600 to shuffle inventory holders at an inventory pier 106. The inventory pier defines multiple pier locations 130, such as the five pier locations shown in these figures. Five inventory holders are positioned in the pier locations, including an inventory holder A in position 130(1). It is noted that more or less locations and inventory holders may be arranged in an area associated with the inventory pier 106. In this scenario 600, the mobile drive unit is removing an inventory holder A from which the picker has retrieved the necessary items to fill an order and replacing it with a new inventory holder B with items that the picker is likely to need in the near future to fill a new order.

Figure 6A:
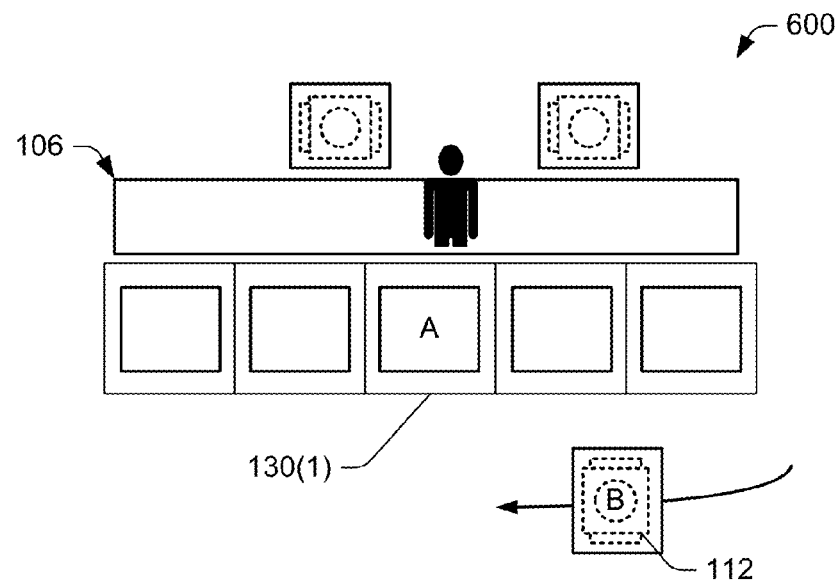
FIGS. 6A-6F present a sequence of illustrations to show use of the shuffle process of FIG. 3 to shuffle inventory holders at an inventory pier.
Figure 6B:
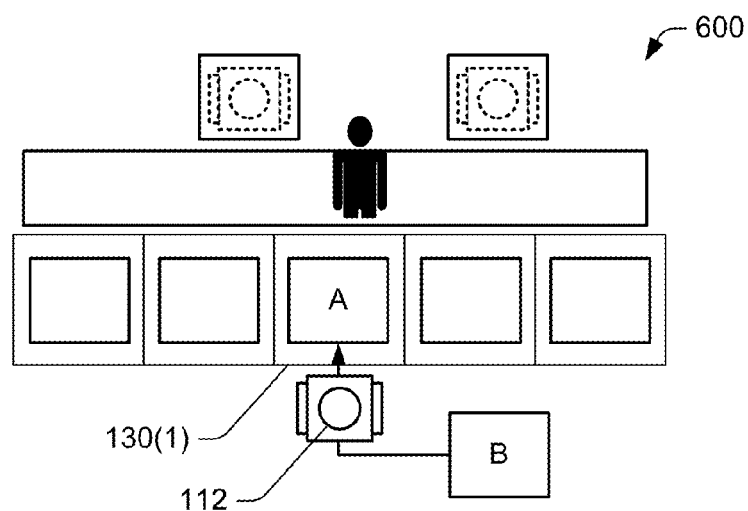

In FIG. 6A, the mobile drive unit 112 brings a new inventory holder B to the inventory pier. The mobile drive unit 112 temporarily places the inventory holder B in a temporary location near the permanent locations, proximal to the pier location 130(1). In FIG. 6B, the mobile drive unit 112 moves to the pier location 130(1) to dock with the inventory holder A.

Figure 6C:
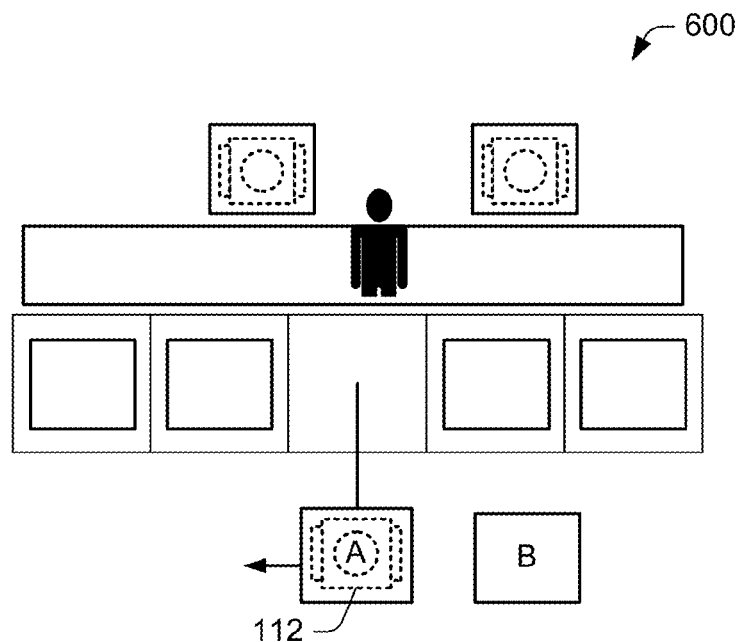
Figure 6D:
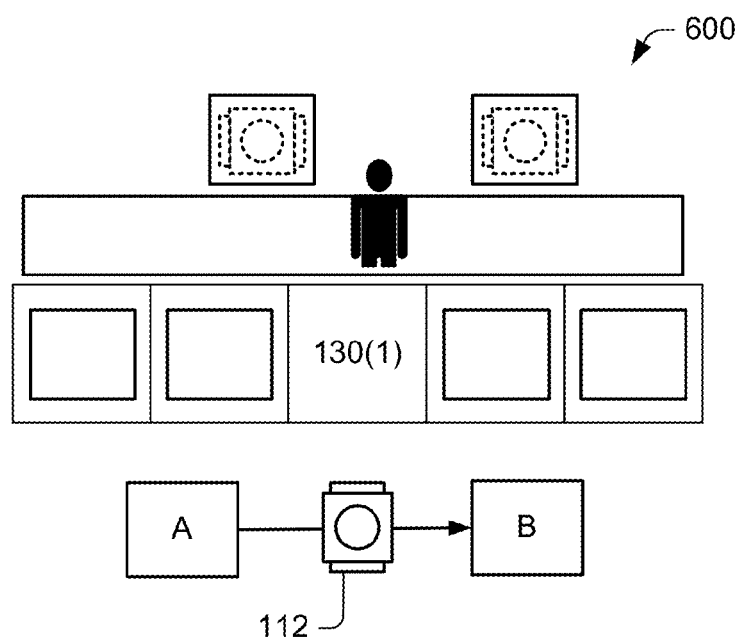

In FIG. 6C, the mobile drive unit 112 lifts the inventory holder A and repositions it from the pier location 130(1) to a temporary location beside the pier locations. In FIG. 6D, the mobile drive unit 112 moves from the inventory holder A to the inventory holder B at rest in a temporary location.

Figure 6E:
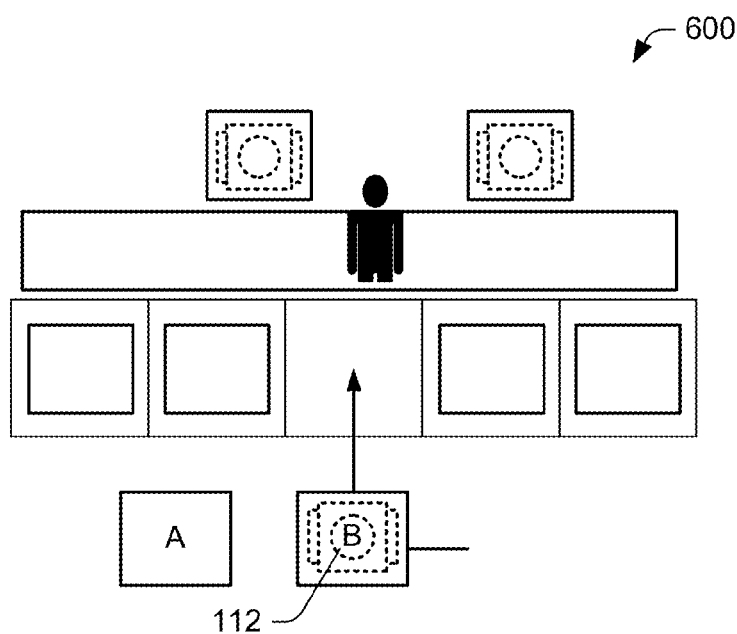
Figure 6F:
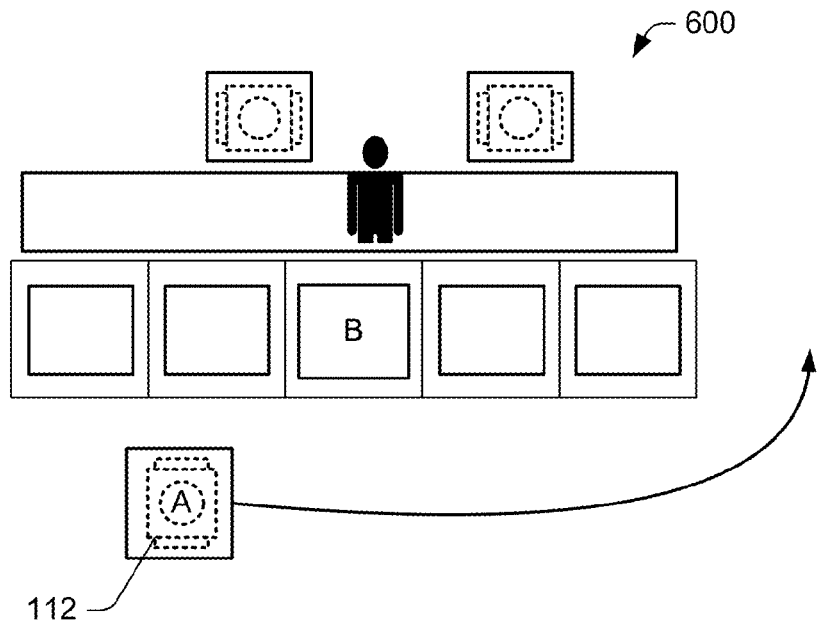

In FIG. 6E, the mobile drive unit 112 lifts the inventory holder B and repositions it into the pier location 130(1) just vacated by the inventory holder A. The mobile drive unit 112 undocks with the inventory holder B, and then moves back to the inventory holder A in its temporary location. In FIG. 6F, the mobile drive unit 112 transports the inventory holder A away from the inventory pier. For instance, the mobile drive unit transfers the inventory holder A to a storage location in the storage area.

FIGS. 4-6 are merely representative examples of the shuffle process being used at various regions within an inventory system. These are not intended to be limiting, and other uses and variations of the process may be used.

Figure 7:
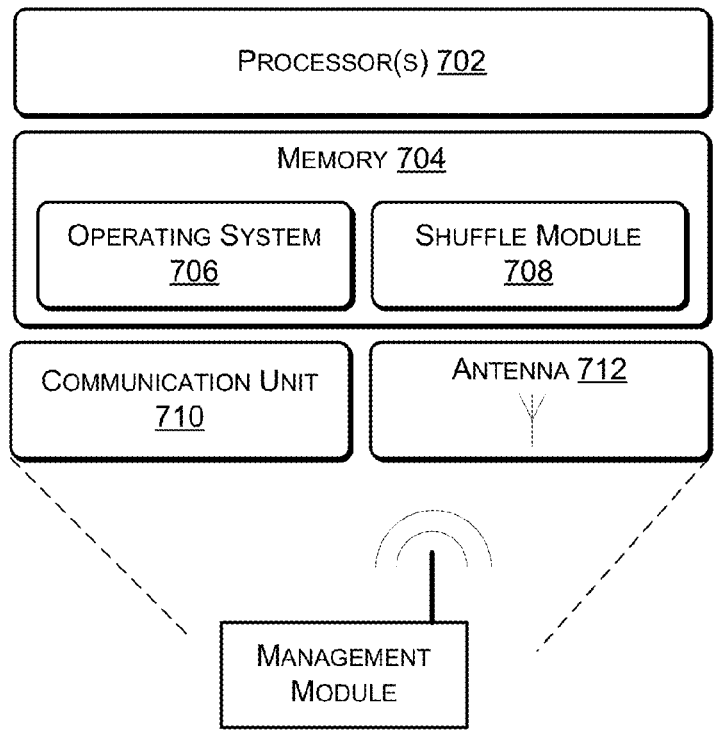
FIG. 7 is a block diagram of select components in a management module used in the inventory system of FIG. 1.

FIG. 7 shows select components in the management module 110 according to one possible implementation. The management module 110 may be implemented by one or more computers having processing, memory, and communications capabilities. The module 110 may be a dedicated device, or a general computer system programmed to perform the management operations.

In FIG. 7, the management module 110 includes one or more processors 702 and memory 704. The processor(s) 702 are configured to execute instructions, such as those instructions stored in memory 704, or in other memory accessible to the processor(s) 702, such as storage in cloud-based resources. The memory 704 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules, such as instructions, datastores, and so forth may be stored within the memory 704 and configured to execute on a processor(s) 702. An operating system module 706 is configured to manage hardware and services within and coupled to the management module 110 for the benefit of other components. A shuffle module 708 is configured to direct the mobile drive units 112 to perform the shuffle process described herein at various times and locations throughout the inventory system. The shuffle module 708 may provide a list of tasks to fully perform the shuffle process, or may provide instructions as-needed for the mobile drive unit to shuffle the inventory holders. In that way, the management module 110 may either micro manage each movement of the mobile drive units throughout a shuffle process, or may simply provide a plan and timing for the mobile drive units to carry out on their own independently of further instructions. In this latter scenario, each mobile drive unit 112 may be equipped with hardware and/or software components that are configured to enable the unit to perform the shuffle technique independently of the management module 110, as will be described in more detail with reference to FIG. 8.

The management module 110 further includes a communication unit 710 to communicate with the mobile drive units or with other computing devices. The communication unit 710 enables access to one or more types of network, including wired and wireless networks. More generally, the coupling between the management module 110 and any components in the inventory system may be via wired technologies, wireless technologies (e.g., RF, cellular, satellite, Bluetooth, etc.), or other connection technologies. When implemented as a wireless unit, the communication unit 710 uses an antenna 712 to send and receive wireless signals.

Figure 8:
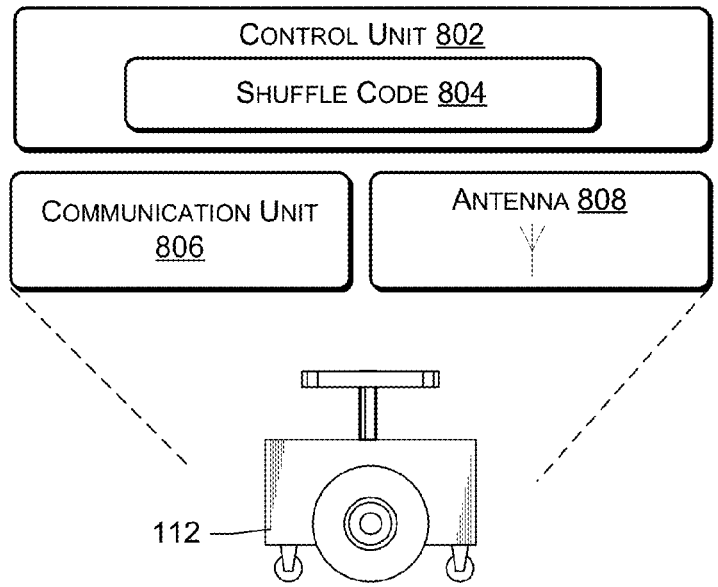
FIG. 8 is a block diagram of select components in a mobile drive unit used in the inventory system of FIG. 1.

FIG. 8 shows select computing components that may be implemented in the mobile drive unit 112. The computing components may include a control unit 802 that is formed using one or more of generally computing hardware, specially-dedicated hardware, software, or firmware. The control unit 802 may execute shuffle code 804 that enables the mobile drive unit 112 to perform the shuffle process described herein. The shuffle code may be independently executed by the mobile drive unit 112, or alternatively through interaction with instructions received from the management module 110.

The mobile drive unit 112 may further be equipped with a communication unit 806 to communicate with other mobile drive units and/or with the management module 110. The communication unit 806 enables access to one or more types of network, including wired and wireless networks. When implemented as a wireless unit, the communication unit 806 uses an antenna 808 to send and receive wireless signals.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A mobile drive unit comprising:
   a drive component; and
   a control unit configured to generate control instructions for the drive component based at least in part on a predefined shuffle process, the control instructions are configured to cause the drive component to:
   retrieve a new inventory holder from a storage location;
   temporarily place the new inventory holder in a temporary staging location of a region of a warehouse, the region including a pick station;
   reposition a first inventory holder from a first pick location within the region to the temporary staging location upon the first inventory holder attaining a completion status;
   subsequently position a second inventory holder from a second pick location into the first pick location vacated by repositioning the first inventory holder;
   transport the first inventory holder away from the temporary staging location; and
   reposition the new inventory holder from the temporary staging location to the second pick location or a third pick location.

2. The mobile drive unit as recited in claim 1, wherein the control instructions further cause the drive component to initially place the second inventory holder in a temporary location while the first inventory holder is repositioned from the first pick location to the temporary staging location.

3. The mobile drive unit as recited in claim 1, wherein the control instructions further cause the drive component to initially reposition the second inventory holder from an original location to a temporary location in order to clear a path from the second pick location to the first pick location.

4. The mobile drive unit as recited in claim 1, wherein the control instructions further cause the drive component to initially retrieve the second inventory holder from another region of the warehouse and temporarily position the second inventory holder in a temporary location while the first inventory holder is repositioned from the first pick location to the temporary staging location.

5. The mobile drive unit as recited in claim 1, wherein the temporary staging location is proximal to the first pick location.

6. The mobile drive unit as recited in claim 1, wherein the second pick location is adjacent to the first pick location.

7. The mobile drive unit as recited in claim 1, wherein the control unit comprises memory configured to store shuffle instructions that are based at least in part on the predefined shuffle process, the shuffle instructions configured to control operation of the drive component.

8. A mobile drive unit comprising:
   a drive component;
   a communication unit configured to receive drive instructions based at least in part on a predefined shuffle process; and
   a control unit configured to operate the drive component based at least in part on the received drive instructions, the drive instructions configured to cause the drive component to:
   retrieve a new inventory holder from a storage location and temporarily place the new inventory holder in a temporary staging location of a region of a warehouse, the region including a pick station;
   reposition a first inventory holder from a first pick location within the region to the temporary staging location within the region upon the first inventory holder attaining a completion status;
   subsequently position a second inventory holder from a second pick location into the first pick location vacated by repositioning the first inventory holder;
   transport the first inventory holder away from the temporary staging location; and
   reposition the new inventory holder from the temporary staging location to the second pick location or a third pick location.

9. The mobile drive unit as recited in claim 8, wherein the drive instructions further cause drive component to initially reposition the second inventory holder in a temporary location while the first inventory holder is repositioned from the first pick location to the temporary staging location.

10. The mobile drive unit as recited in claim 8, wherein the drive instructions further cause the drive component to initially reposition the second inventory holder from an original location to a temporary location in order to clear a path from the second pick location to the first pick location.

11. The mobile drive unit as recited in claim 8, wherein the drive instructions further cause the drive component to initially retrieve the second inventory holder from another region of the warehouse and temporarily position the second inventory holder in a temporary location while the first inventory holder is repositioned from the first pick location to the temporary staging location.

12. The mobile drive unit as recited in claim 8, wherein the temporary staging location is proximal to the first pick location.

13. The mobile drive unit as recited in claim 8, wherein the second pick location is adjacent to the first pick location.

14. The mobile drive unit as recited in claim 8, wherein the predefined shuffle process is based at least on a layout of the warehouse.

15. A mobile drive unit comprising:
   a drive component; and
   a control unit configured to instruct the drive component to shuffle a first inventory holder, a second inventory holder, and a third inventory holder within a warehouse according to a predefined shuffle process, wherein the first inventory holder is positioned at a first pick location of a pick station, the second inventory holder is positioned at a second pick location of the pick station, and the third inventory holder is positioned at a third pick location of the pick station, the control unit instructs the drive component to:
   retrieve a new inventory holder and deposit the new inventory holder in a first holding location;
   move the first inventory holder from the first pick location to a second holding location upon the first inventory holder attaining a complete status;
   subsequently move the second inventory holder from the second pick location into the first pick location vacated by the first inventory holder;
   subsequently move the third inventory holder from the third pick location into the second pick location vacated by the second inventory holder; and
   subsequently move the first inventory holder away from the second holding location to remove the first inventory holder from the pick station.

16. The mobile drive unit as recited in claim 15, wherein the control unit instructs the drive component to subsequently move the new inventory holder into the third pick location vacated by the third inventory holder.

17. The mobile drive unit as recited in claim 15, wherein the first holding location and the second holding location are located adjacent to each other and are separate from the first pick location, the second pick location, and the third pick location.

18. The mobile drive unit as recited in claim 15, wherein the first holding location and the second holding location are located within the pick station.

19. The mobile drive unit as recited in claim 15, wherein the predefined shuffle process is based at least on a physical layout of the warehouse.

20. The mobile drive unit as recited in claim 15, further comprising an antenna configured to allow communication with at least one of a shuffle process management system or another mobile drive unit.

* * * * *